United States Patent
Khlat et al.

(10) Patent No.: US 9,806,773 B2
(45) Date of Patent: Oct. 31, 2017

(54) APPARATUS FOR A MULITPLE-INPUT MULTIPLE-OUTPUT (MIMO) ARCHITECTURE

(71) Applicant: Qorvo US, Inc., Greensboro, NC (US)

(72) Inventors: Nadim Khlat, Cugnaux (FR); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/233,359

(22) Filed: Aug. 10, 2016

(65) Prior Publication Data
US 2017/0111089 A1   Apr. 20, 2017

Related U.S. Application Data

(60) Provisional application No. 62/242,385, filed on Oct. 16, 2015.

(51) Int. Cl.
| | | |
|---|---|---|
| *H04B 7/00* | (2006.01) | |
| *H04B 7/0413* | (2017.01) | |
| *H04B 7/06* | (2006.01) | |
| *H04B 7/0452* | (2017.01) | |

(52) U.S. Cl.
CPC ......... *H04B 7/0413* (2013.01); *H04B 7/0452* (2013.01); *H04B 7/0617* (2013.01); *Y02B 60/50* (2013.01)

(58) Field of Classification Search
CPC ... H04B 7/0413; H04B 7/0617; H04B 7/0452
See application file for complete search history.

(56) References Cited

U.S. PATENT DOCUMENTS

| | | | | |
|---|---|---|---|---|
| 8,537,723 | B2 * | 9/2013 | Khlat | H03F 3/189 370/277 |
| 2008/0205548 | A1 * | 8/2008 | Rofougaran | H03G 1/0029 375/297 |
| 2013/0016632 | A1 * | 1/2013 | Mujtaba | H04B 7/0608 370/275 |
| 2015/0194884 | A1 * | 7/2015 | Levesque | H03F 3/193 375/297 |

OTHER PUBLICATIONS

Author Unknown, "Comparison of UL TX diversity schemes for PUSCH," Huawei, 3GPP TSG RAN WG1#57bis, R1-092382, Jun. 29-Jul. 3, 2009, Los Angeles, CA, 6 pages.

Author Unknown, "Initial comparison of UL TX diversity solutions for LTE-Advanced," Huawei, 3GPP TSG RAN WG1#54bis, R1-083707, Sep. 29-Oct. 3, 2008, Prague, Czech Republic, 10 pages.

(Continued)

*Primary Examiner* — Dac Ha
(74) *Attorney, Agent, or Firm* — Withrow & Terranova, P.L.L.C.

(57) ABSTRACT

An apparatus for a multiple-input multiple-output (MIMO) architecture is disclosed. The apparatus includes a first splitter-combiner (S-C) having a first transmission line port, a first transmit (TX) port, and a first receive (RX) port. Also included is a first N-plexer having a first power amplifier (PA) input, a first RX output, and a first antenna output for coupling to a first antenna. A first PA is coupled between the first TX port and the PA input, wherein the first RX output is coupled to the first RX port.

21 Claims, 5 Drawing Sheets

(56) References Cited

OTHER PUBLICATIONS

Author Unknown, "PUCCH TxD Schemes for LTE-A," LG Electronics, 3GPP TSG RAN WG1 #57bis, R1-092509, Jun. 29-Jul. 3, 2009, Los Angeles, CA, 6 pages.
Author Unknown, "Technical Specification Group Radio Access Network; Evolved Universal Terrestrial Radio Access (E-UTRA);Physical channels and modulation (Release 12)," 3GPP Technical Specification 36.211, Version 12.4.0, Dec. 2014, Sections 5.3 and 5.4.
Author Unknown, "Technical Specification Group Radio Access Network; Evolved Universal Terrestrial Radio Access (E-UTRA);Physical layer procedures (Release 12)," 3GPP Technical Specification 36.213, Version 12.4.0, Dec. 2014, Sections 8.0 and 10.1.
Author Unknown, "Uplink transmit diversity schemes with low cubic metric for LTE-Advanced," Mitsubishi Electric, 3GPP TSG RAN WG1 #54 meeting, R1-083198, Aug. 18-22, 2008, Jeju, South Korea, 6 pages.
Bulus, Umut et al., "Modelling of the Monopole Interaction with a small Chassis," 3rd European Conference on Antennas and Propagation, EuCAP 2009, Mar. 2009, 4 pages.
Villanen, J. et al., "A Wideband Study of the Bandwidth, SAR and Radiation Efficiency of Mobile Terminal Antenna Structures," Proceedings of the International Workshop on Antenna Technologies Conference, IWAT'07, Mar. 2007, Cambridge, UK, pp. 49-52.

\* cited by examiner

APPARATUS FOR A MULITPLE-INPUT MULTIPLE-OUTPUT (MIMO) ARCHITECTURE

RELATED APPLICATIONS

This application claims the benefit of provisional patent application Ser. No. 62/242,385, filed Oct. 16, 2015, the disclosure of which is hereby incorporated herein by reference in its entirety.

FIELD OF THE DISCLOSURE

Embodiments of the present disclosure relate to radio frequency (RF) communications systems, which may include RF front-end circuitry, RF transceiver circuitry, RF amplifiers, direct current (DC)-DC converters, RF filters, RF antennas, RF switches, RF combiners, RF splitters, the like, or any combination thereof.

BACKGROUND

Particularly in light of Carrier Aggregation (CA) schemes supported by modern cellular communications networks, wireless devices, such as mobile phones, typically support multiple frequency bands. Support for multiple frequency bands is provided by multiple radio front-ends, each supporting one or more frequency bands. The radio front-ends are connected to a common antenna via a multiplexer (e.g., a diplexer for the dual-band scenario or a triplexer for a tri-band scenario). In addition, in order to support Multiple-Input-Multiple-Output (MIMO) operation, wireless devices may also include an additional antenna(s) along with a corresponding multiplexer(s) and radio front-end(s).

SUMMARY

An apparatus for a multiple-input multiple-output (MIMO) architecture is disclosed. The apparatus includes a first splitter-combiner (S-C) having a first transmission line port, a first transmit (TX) port, and a first receive (RX) port. Also included is a first N-plexer having a first power amplifier (PA) input, a first RX output, and a first antenna output for coupling to a first antenna. A first PA is coupled between the first TX port and the PA input, wherein the first RX output is coupled to the first RX port.

In an exemplary embodiment, the apparatus further includes a second transmission line port, a first transceiver having a first TX output and a first RX input, and a second S-C having the second transmission line port, a second TX port coupled to the TX output, and a second RX port coupled to the first RX input. The first transmission line port, the first S-C, the first N-plexer, and the first PA are provided in a first module and the second transmission line port, the first transceiver, and the second S-C are provided in a second module.

In yet another exemplary embodiment, the first module and the first antenna are mounted in a mobile terminal housing having opposing first and second ends. In this exemplary embodiment, the first module is mounted at the first end and the second module and antenna are mounted at the second end. A transmission line couples the first transmission line port of the first module to the second transmission line port of the second module.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
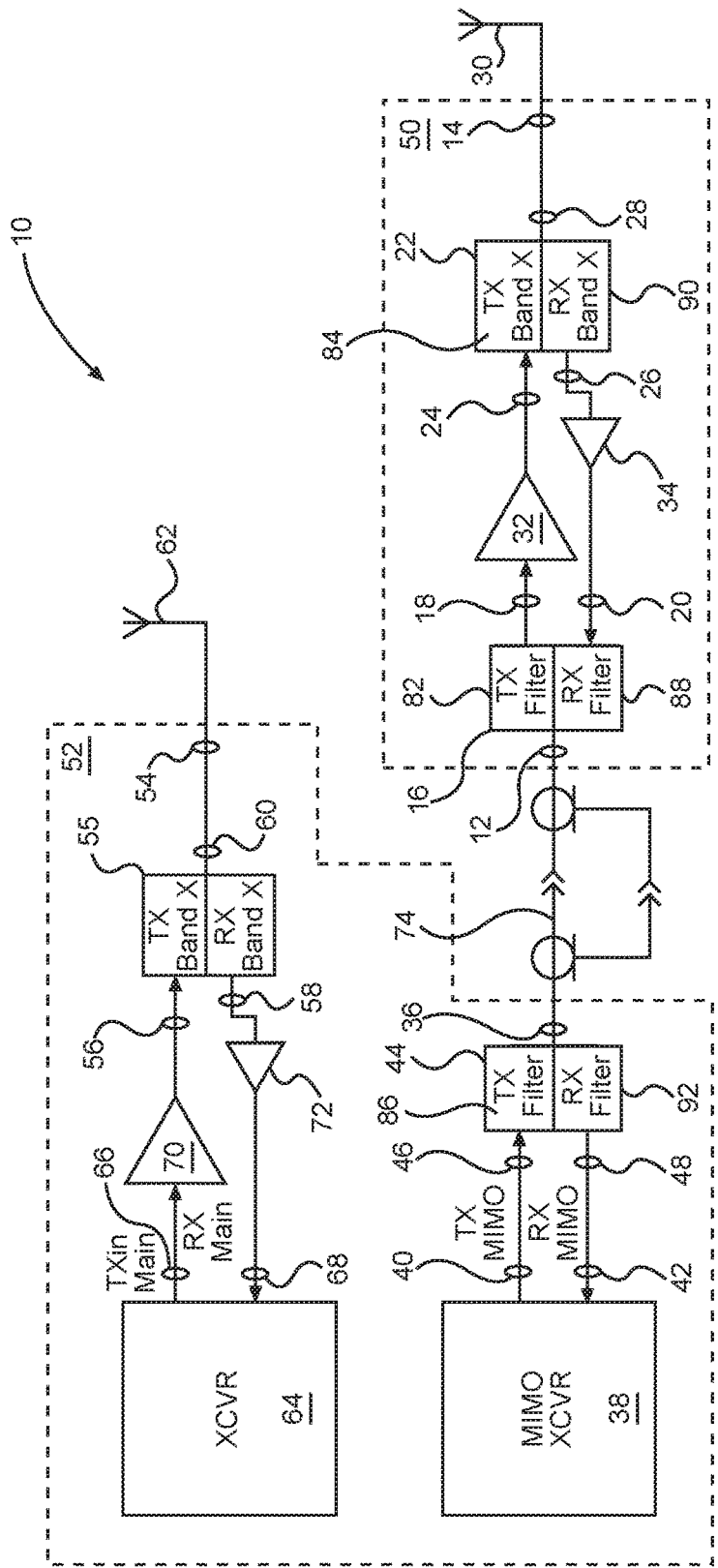
FIG. 1 is a schematic of a first embodiment of an apparatus for a multiple-input multiple output (MIMO) architecture that is in accordance with the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. For example, an N-plexer is defined as a multi-filter device that provides isolation between signal ports.

FIG. 1 is a schematic of a first embodiment of an apparatus 10 for a multiple-input multiple output (MIMO) architecture that is in accordance with the present disclosure. The apparatus 10 includes a first transmission line port 12, a first antenna port 14, and a first splitter-combiner (S-C) 16 having the first transmission line port 12, a first transmit (TX) port 18, and a first receive (RX) port 20. A first N-plexer 22 having a first power amplifier (PA) input 24, a first RX output 26, and a first antenna output 28 for coupling to a first antenna 30 is also included along with a first PA 32 coupled between the first TX port 18 and the PA input 24, wherein the first RX output 26 is coupled to the first RX port 20. In this exemplary embodiment, a first low noise amplifier (LNA) 34 is coupled between the first RX output 26 and the first RX port 20.

The apparatus 10 also includes a second transmission line port 36 and a first transceiver 38 having a first TX output 40 and a first RX input 42. Further included is a second S-C 44 having the second transmission line port 36, a second TX port 46 coupled to the first TX output 40, and a second RX port 48 coupled to the first RX input 42. The first transmission line port 12, the first antenna port 14, the first S-C 16, the first N-plexer 22, and the first PA 32 are provided in a first module 50 and the second transmission line port 36, the first transceiver 38, and the second S-C 44 are provided in a second module 52.

The second module 52 also includes a second antenna port 54, a second N-plexer 55 having a second PA input 56, a second RX output 58, and a second antenna output 60 for coupling to a second antenna 62. A second transceiver 64 having a second TX output 66 and a second RX input 68 is also included. A second PA 70 is coupled between the second TX output 66 and the second PA input 56, wherein the second RX output 58 is coupled to the second RX input 68. In this exemplary embodiment, a second LNA 72 is coupled between the second RX output 58 and the second RX input 68.

In the exemplary embodiment of FIG. 1, a transmission line 74 is coupled between the first transmission line port 12 and the second transmission line port 36. Moreover, in this exemplary embodiment, the first transceiver 38 is a multiple-input multiple-output (MIMO) transceiver, the first antenna 30 is a MIMO antenna, the second transceiver 64 is a main transceiver, and the second antenna 62 is a main antenna.

Related art MIMO architecture does not include the first S-C 16 and the second S-C 44 because a MIMO PA that is similar to the first PA 32 and the second PA 70 are both located on the same module located near a main antenna. A MIMO antenna in related art architecture is located at an opposite end of a mobile terminal housing. As a result, related art MIMO architecture will suffer from a large battery current because the MIMO PA output has to drive a large 3 dB post-PA insertion loss due to a transmission line such as the transmission line 74 that routes route TX MIMO signals to the MIMO antenna which is typically physically located at a distance from the MIMO PA that is between 15 cm to 40 cm. Apparatus 10 of the present disclosure practically eliminates the large 3 dB post-PA insertion loss in the transmission line 74 by coupling the first antenna port 14 directly to the first antenna 30 so that an amplified TX signal is not transmitted through the transmission line 74. A physical arrangement that makes this power efficiency possible is depicted in FIG. 2.

Figure 2:
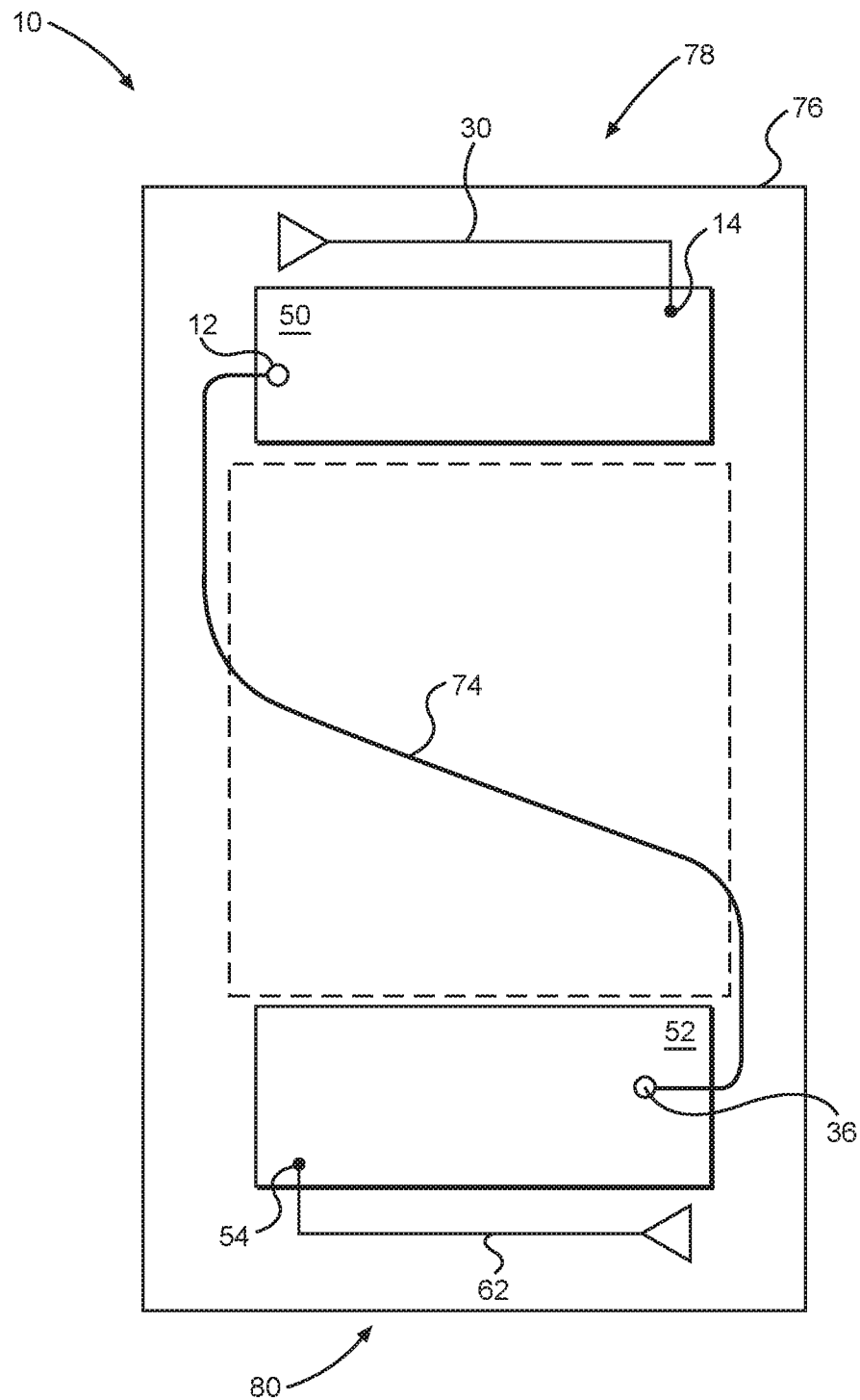
FIG. 2 is a diagram of a mobile terminal housing having a first and second opposing ends, wherein the first module and the first antenna are mounted at the first end and the second module and the second antenna are mounted at the second end.

FIG. 2 is a diagram of a mobile terminal housing 76 having a first end 78 opposite a second end 80, wherein the first module 50 and the first antenna 30 are mounted at the first end 78 and the second module and the second antenna 62 are mounted at the second end 80. The transmission line 74 couples the first transmission line port 12 to the second transmission line port 36. In the exemplary embodiment, the transmission line 74 is a coaxial cable. However, it is to be understood that other types of transmission line such as twin-lead without falling outside the scope of the present disclosure. No matter the type of the transmission line 74, power losses within the transmission line are mitigated by coupling the first module 50 with the first PA 32 between the transmission line 74 and the first antenna 30. As a result, the first module 50 is relatively co-located with the first antenna 30 in comparison with second antenna 62, which is relatively co-located with the second module 52.

The arrangement of the first module 50 and the second module 52 depicted in FIGS. 1 and 2 mitigate battery current drain even with added insertion loss due to the use of the first S-C 16 and the second S-C 44 will be much less than related-art arrangements because transceiver output power will be increased by approximately 2×0.6 dB=1.2 dB relative to the power losses due to the first S-C 16 and the second S-C 44. In other words, less power is wasted in comparison to related art if a transmit power level is +26.2 dBm vs +25 dBm. Note that the first transceiver 38 and the second transceiver 64 are usually co-located in the same integrated circuit die or close at least to the same baseband modem (not shown). Thus, moving the first transceiver 38 close to the first antenna 30 is generally not an option.

Returning to FIG. 1, another advantage provided by the apparatus 10 is illustrated. The advantage is that TX filtering is shared among a first TX filter 82 comprising the first S-C 16, a second TX filter 84 comprising the first N-plexer 22, and a third TX filter 86 comprising the second S-C 44. As such, RF band selectivity requirements for the first TX filter 82, the second TX filter 84, and the third TX filter 86 are relaxed in comparison to a stricter RF band selectivity requirement that is typically associated with the first N-plexer 22. Another advantage is that RX filtering is shared among a first RX filter 88 comprising the first S-C 16, a second RX filter 90 comprising the first N-plexer 22, and a third RX filter 92 comprising the second S-C 44. As such, RF band selectivity requirements for the first RX filter 88, the second RX filter 90, and the third RX filter 92 are relaxed in comparison to a stricter RF band selectivity requirement that is typically associated with the first N-plexer 22. In a case in which a TX MIMO frequency range can cover multiple transmit bands in which none of them overlap within the RX bands, the first S-C 16 and the second S-C 44 are both designed to cover an overall frequency range of bands that include a high frequency band (HB) and a very high frequency band (VHB) for TX MIMO and all bands for RX MIMO.

Figure 3:
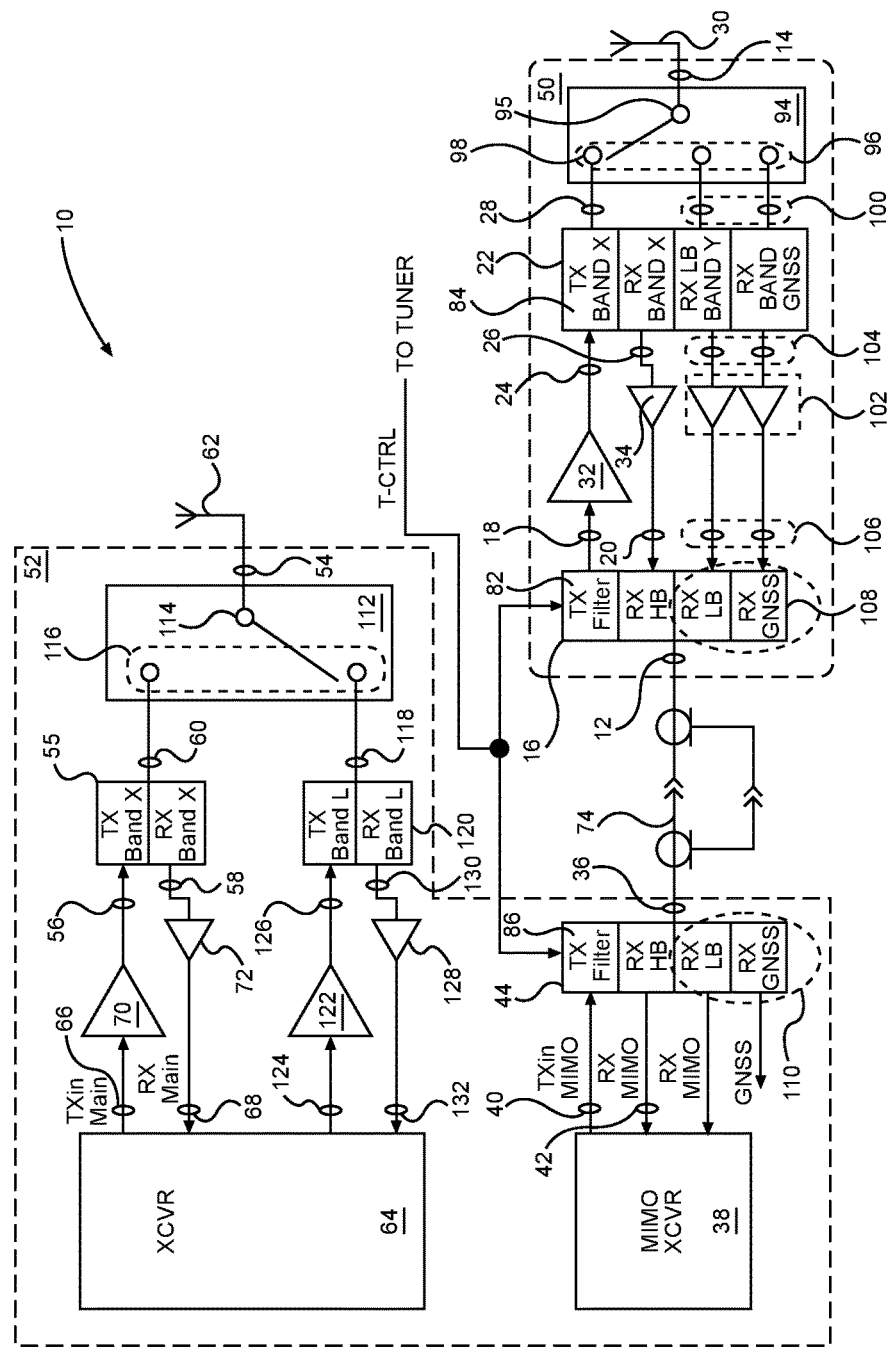
FIG. 3 is a schematic of another embodiment of the apparatus that is configured for operation within multiple RX carrier aggregation bands.

FIG. 3 is another embodiment of the apparatus 10 that is configured for operation within multiple RX carrier aggregation (CA) bands. In this embodiment, the first module 50 includes a first RF switch 94 having a switch pole 95 coupled to the first antenna port 14 and a plurality of switch throws 96 that includes one switch throw coupled to the first antenna output 28 of the first N-plexer 22, wherein the first N-plexer 22 further includes additional RX inputs 100 that are each coupled to an associated one of a remaining number of the plurality of switch throws 96. Additional LNAs 102 are coupled between corresponding ones of additional RX outputs 104 and additional RX ports 106 of additional RX filters 108 that can include filtering for non-MIMO signals such as global navigation satellite system (GNSS) signals. The additional RX filters 108 comprise a modified version of the first S-C 16. A modified version of the second S-C 44 includes additional RX filters 110 that filer the same bands as the additional RX filters 108. For example, one of the additional RX filters 110 can filter an RX low-band signal LB, while the other can filter GNSS signals. The GNSS signals are routed to external circuitry (not shown) while RX LB signals are routed to the first transceiver.

In operation of this embodiment in a time division duplex (TDD) mode there can be situations during carrier aggregation (CA) frequency division duplex (FDD)-TDD that allow a TDD signal in a TX MIMO band to be transmitting at the same time other signals are being received in FDD. The first TX filter 82 and the third TX filter 86 only have to handle TX signals that are below +5 dBm. As a result, the first TX filter 82 and the third TX filter 86 are made of acoustic resonators such as bulk acoustic wave (BAW) filters and/or surface acoustic wave (SAW) filters, which can also include inductor and/or capacitor elements. The use of acoustic filter technology is of interest due to the relatively close spacing between transmit and receive frequencies. However, because acoustic filters do not need to handle power greater than +5 dBm, the first TX filter 82 and the third TX filter 86 can be realized with less stacking than typically needed for signals that are amplified to levels beyond +5 dBm.

The first TX filter 82 comprising the first S-C 16 and the third TX filter 86 comprising the second S-C 44 are electronically tunable in one embodiment. A tuner control line T-CTRL is coupled between the first TX filter 82 and the third TX filter 86 is coupled to an external tuner (not shown). The first TX filter 82 and the third TX filter 86 can be made tunable by way of programmable capacitor arrays (not shown) that are integrated with the first TX filter 82 and the third TX filter 86. Tuner control can also be extended to tune the additional RX filters 108 and 110. The tuning selections can depend upon an absolute radio frequency channel number (ARFCN) that is a unique number given to each radio channel within a particular RF band.

In this exemplary embodiment, the second module 52 further includes a second RF switch 112 having a switch pole 114 coupled to the first antenna port 54 and a plurality of switch throws 116 that includes one switch throw coupled to the second antenna output 60 of the second N-plexer 55. Another one of the plurality of switch throws is coupled to third antenna output 118 of a third N-plexer 120. A third PA 122 is coupled between a third TX output 124 and a third PA input 126. Moreover, transceiver LNA 128 is coupled between a third RX output 130 and a third RX input 132.

Figure 4:
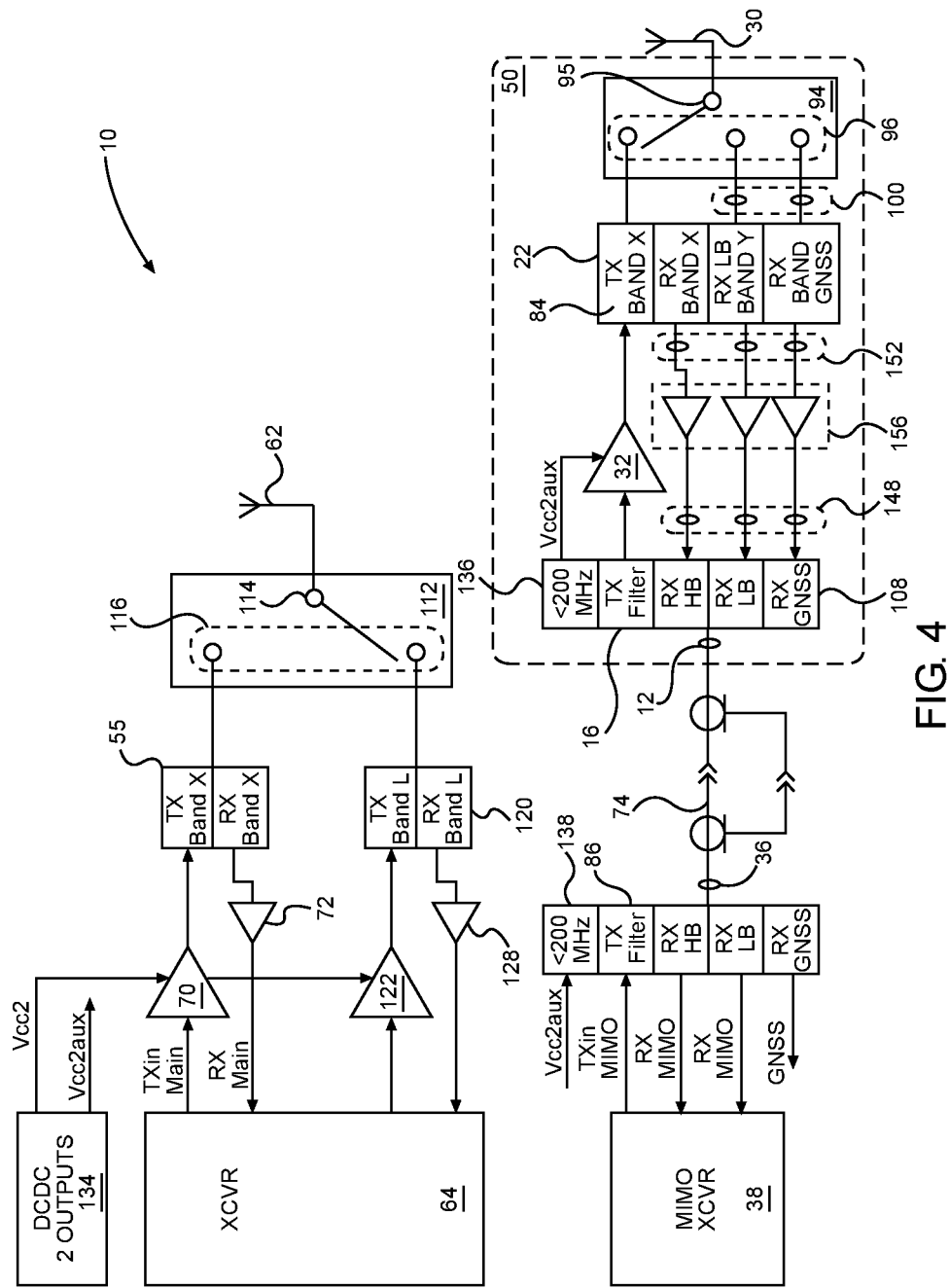
FIG. 4 is a schematic of another embodiment of the apparatus that has modifications of both the first S-C and the second S-C that are needed to pass DC power to the first PA by combining and then splitting RF TX and RX signals with a switching power signal from a DC-DC converter.

Returning to FIG. 2, a height constraint near the first end 78 typically requires that parts located near the first antenna 30 be no more of 0.65 mm tall. Therefore, if the first PA 32 is supplied from a power management integrated circuit (IC) having average power tracking (APT) and/or envelope tracking (ET) mode, the power management IC will typically have a power inductor with a height taller than 0.65 mm. As such, the power management IC cannot be located near the first PA 32. Another embodiment of the apparatus 10 shown in FIG. 4 modifies the first S-C 16 and the second S-C 44 to pass DC power to the first PA 32 by combining and then splitting RF TX and RX signals with a switching power signal from a DC-DC converter 134. The switching power signal is below 200 MHz. Therefore, a first low-pass filter 136 added to the first S-C 16 and a second low-pass filter 138 added to the second S-C 44 allows avoiding routing a power line to the first PA 32. It is to be understood that supplying power to the first PA 32 in this fashion is different from a related art technique of multiplexing mobile industry processor interface-radio frequency front end (MIPI-RFFE) signals and battery power on a coaxial line such as transmission line 74. The reason is that battery power typically does not require filtering and can be applied over a coaxial line directly. In contrast, the power required by the first PA 32 in either the APT mode or the ET mode include AC components that not present in battery power.

Figure 5:
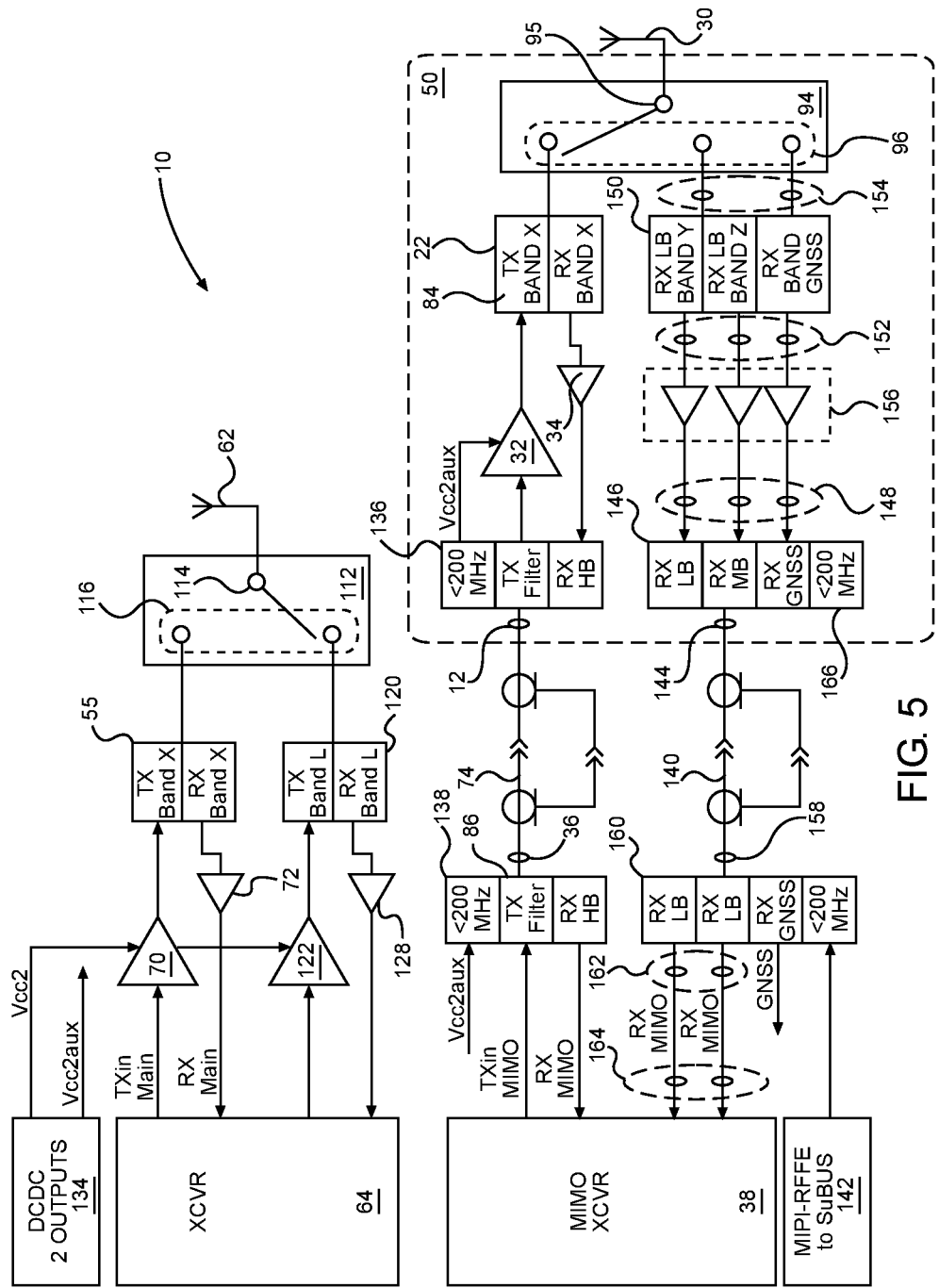
FIG. 5 is a schematic of another embodiment of the apparatus that provides operation in various MIMO bands while adding filtering and an additional transmission line for passing serial bus data to circuitry on or near the first module.

FIG. 5 is a schematic of another embodiment of the apparatus 10 that provides operation in various MIMO bands while adding filtering and utilizing a second transmission line 140 for passing serial bus data from a serial bus controller 142 over the second transmission line 140 to digital circuitry (not shown) on or near the first module 50. In this particular embodiment, the apparatus 10 includes a third transmission line port 144, and a third S-C 146 having the third transmission line port 144, and a third RX port 148. A first RX only N-plexer 150 having a first set of RX outputs 152, and a first set of antenna outputs 154 for coupling to the first antenna 30 is also included. In this exemplary embodiment, a first set of LNAs 156 is coupled between the first set of RX outputs 152 and the third RX port 148.

The apparatus 10 of this exemplary embodiment also includes a fourth transmission line port 158 and a fourth S-C 160 having a fourth RX port 162 coupled to additional transceiver RX inputs 164. The second transmission line 140 is coupled between the third transmission line port 144 and the fourth transmission line port 158. The third S-C 146 includes a third low-pass filter 166 and the fourth SC-160 includes a fourth low-pass filter 168, both of which are used for filtering serial bus data from other signals that pass over the second transmission line 140. In this exemplary embodiment, both the third low-pass filter 166 and the fourth low-pass filter 168 attenuate signals above 200 MHz and pass signals below 200 MHz.

Those skilled in the art will recognize improvements and modifications to the preferred embodiments of the present disclosure. All such improvements and modifications are considered within the scope of the concepts disclosed herein and the claims that follow.

What is claimed is:

1. An apparatus comprising:
    a first splitter-combiner (S-C) having a first transmission line port, a first transmit (TX) port, and a first receive (RX) port;
    a first N-plexer having a first power amplifier (PA) input, a first RX output, and a first antenna output for coupling to a first antenna;
    a first PA coupled between the first TX port and the first PA input, wherein the first RX output is coupled to the first RX port;
    a first transceiver having a first TX output and a first RX input; and
    a second S-C having a second transmission line port, a second TX port coupled to the first TX output, and a second RX port coupled to the first RX input wherein the first transmission line port, the first S-C, the first N-plexer, and the first PA are provided in a first module and the second transmission line port, the first transceiver, and the second S-C are provided in a second module.

2. The apparatus of claim 1 further comprising a first low noise amplifier (LNA) coupled between the first RX output and the first RX port.

3. The apparatus of claim 1 wherein the second module further comprises:
    a second N-plexer having a second PA input, a second RX output, and a second antenna output for coupling to a second antenna;
    a second transceiver having a second TX output and a second RX input;
    a second PA coupled between the second TX output and the second PA input, wherein the second RX output is coupled to the second RX input.

4. The apparatus of claim 3 further comprising a second low noise amplifier (LNA) coupled between the second RX output and the second RX input.

5. The apparatus of claim 1 further comprising a transmission line coupled between the first transmission line port and the second transmission line port.

6. The apparatus of claim 1 further comprising a mobile terminal housing having opposing first and second ends and wherein the first module and the first antenna are mounted at the first end and the second module and antenna are mounted at the second end.

7. The apparatus of claim 3 wherein the first transceiver is a multiple-input multiple-output (MIMO) transceiver, the first antenna is a MIMO antenna, the second transceiver is a main transceiver, and the second antenna is a main antenna.

8. The apparatus of claim 1 wherein the first S-C further comprises a finite number of additional RX ports and the first N-plexer includes a corresponding number of additional RX outputs that are each coupled to an associated one of the additional RX ports.

9. The apparatus of claim 8 further comprising an RF switch having a switch pole coupled to a first antenna port and a plurality of switch throws that includes one switch throw coupled to the first antenna output of the first N-plexer, wherein the first N-plexer further includes additional RX inputs that are each coupled to an associated one of a remaining number of the plurality of switch throws.

10. The apparatus of claim 1 wherein the first S-C comprises a first electronically tunable TX filter coupled between the first transmission line port and the first TX port.

11. The apparatus of claim 1 wherein the second S-C comprises a second electronically tunable TX filter coupled between the second transmission line port and the second TX port.

12. The apparatus of claim 1 wherein the first S-C comprises a first low pass coupled between the first transmission line port and a first auxiliary power output coupled to a supply input of the first PA, and the second S-C includes a second low pass filter coupled between a second auxiliary power input and the second transmission line port, wherein the first auxiliary power input is coupled to a power output of a switching power converter.

13. The apparatus of claim 1 wherein the first S-C comprises first tunable RX filters coupled between the first transmission line port and the first RX port, and the second S-C includes second tunable filters coupled between the second transmission line port and the second RX port.

14. The apparatus of claim 1 wherein the first module further comprises:
    a third S-C having a third transmission line port, a third TX port, and a third RX port; and
    a third N-plexer having a second plurality of RX outputs, and a second plurality of RX outputs for coupling to the first antenna.

15. The apparatus of claim 14 wherein the second module further comprises:
    a fourth S-C having a fourth transmission line port, a fourth TX port, and a fourth RX port; and
    a fourth N-plexer having a third plurality of RX outputs, and a second plurality of RX outputs coupled to the first transceiver.

16. The apparatus of claim 15 further comprising a second transmission line coupled between the third transmission line port and the fourth transmission line port.

17. The apparatus of claim 15 wherein the third S-C comprises a third low pass filter coupled between the third transmission line port and a first serial bus output, and the fourth S-C includes a fourth low pass filter coupled between a first serial bus input and the fourth transmission line port, wherein the first serial bus input receives data from a processor.

18. An apparatus comprising:
    a first splitter-combiner (S-C) having a first transmission line port, a first transmit (TX) port, and a first receive (RX) port;
    a first N-plexer having a first power amplifier (PA) input, a first RX output, and a first antenna output for coupling to a first antenna;
    a first PA coupled between the first TX port and the first PA input, wherein the first RX output is coupled to the first RX port;
    a first transceiver having a first TX output and a first RX input;
    a second S-C having a second transmission line port, a second TX port coupled to the first TX output, and a second RX port coupled to the first RX input wherein the first transmission line port, the first S-C, the first N-plexer, and the first PA are provided in a first module and the second transmission line port, the first transceiver, and the second S-C are provided in a second module; and a transmission line coupled between the first transmission line port and the second transmission line port.

19. The apparatus of claim 18 further comprising a first low noise amplifier (LNA) coupled between the first RX output and the first RX input, and a second low noise amplifier (LNA) coupled between a second RX output and the second RX input.

20. The apparatus of claim 18 further comprising a mobile terminal housing having opposing first and second ends and wherein the first module and the first antenna are mounted at the first end and the second module and antenna are mounted at the second end.

21. The apparatus of claim 18 wherein the first transceiver is a multiple-input multiple-output (MIMO) transceiver, the first antenna is a MIMO antenna, the second transceiver is a main transceiver, and the second antenna is a main antenna.

* * * * *